June 8, 1926.

H. B. TUTHILL

ELECTRIC MOTOR UNIT

Filed March 29, 1926

Inventor
Howard B. Tuthill
By Frank E. Liverance, Jr.
Attorney.

June 8, 1926.

H. B. TUTHILL 1,587,566

ELECTRIC MOTOR UNIT

Filed March 29, 1926    3 Sheets-Sheet 3

Inventor
Howard B. Tuthill
By Frank E. Liverance, Jr.
Attorney.

Patented June 8, 1926.

1,587,566

UNITED STATES PATENT OFFICE.

HOWARD B. TUTHILL, OF GRAND RAPIDS, MICHIGAN, ASSIGNOR TO OLIVER MACHINERY COMPANY, OF GRAND RAPIDS, MICHIGAN, A CORPORATION OF MICHIGAN.

ELECTRIC-MOTOR UNIT.

Application filed March 29, 1926. Serial No. 98,159.

This invention relates to a combined electric motor and controls therefor built as a unit so that all of the controls and safety devices used in connection with the motor are not only located in close proximity therewith, but are housed with the motor so that all together make a single unit which may be readily applied to various types of machinery which the motor is to drive and in which all of the wires connecting the different elements of the construction are housed and out of the way, there being no danger of injury to the insulation with a consequent short circuit or other undesirable happening. The only wires which are exposed are the feed and ground wires which supply current to the motor and carry the same away.

It is a primary object and purpose of the present invention to provide a unit construction of the type stated and one in which any operation of starting the motor can be only in such manner that the motor will turn first at its lowest speed or rotation, being thereafter gradually stepped up by consecutive steps to different higher speeds of rotation. The control drum, in itself old and well known, is mounted within a housing located directly over the motor housing and such control drum is manually operable from in front of the housing to a number of different revolutions per minute. The manually operable control means is so located with respect to a control button which is operated to effect the closing of a switch that such closing of the switch can occur only when the current is disconnected from the motor. It is necessary to first operate the control button which will effect the closing of the switch with the motor standing idle and thereafter move the control to effect the first and lowest speed of rotation of the motor and thereafter move the control drum to successive different positions for progressive increases in rate of speed. It is one object and purpose of the present invention to provide this construction in a simple and effective manner and also to provide means whereby the motor may be stopped at any speed at which it is rotating. A further object of the invention is to house with the control drum, thermal overload fuses and a low voltage release whereby the switch which connects the feed wires carrying the current with the motor is automatically disconnected should the voltage on the lathe fall below a desirable amount, all being completely bound with the control drum. These and many other objects and purposes will appear fully and in detail as understanding of the invention is had from the following description taken in connection with the accompanying drawings, in which:—

Like reference characters refer to like parts in the several views of the drawings.

Figure 1:
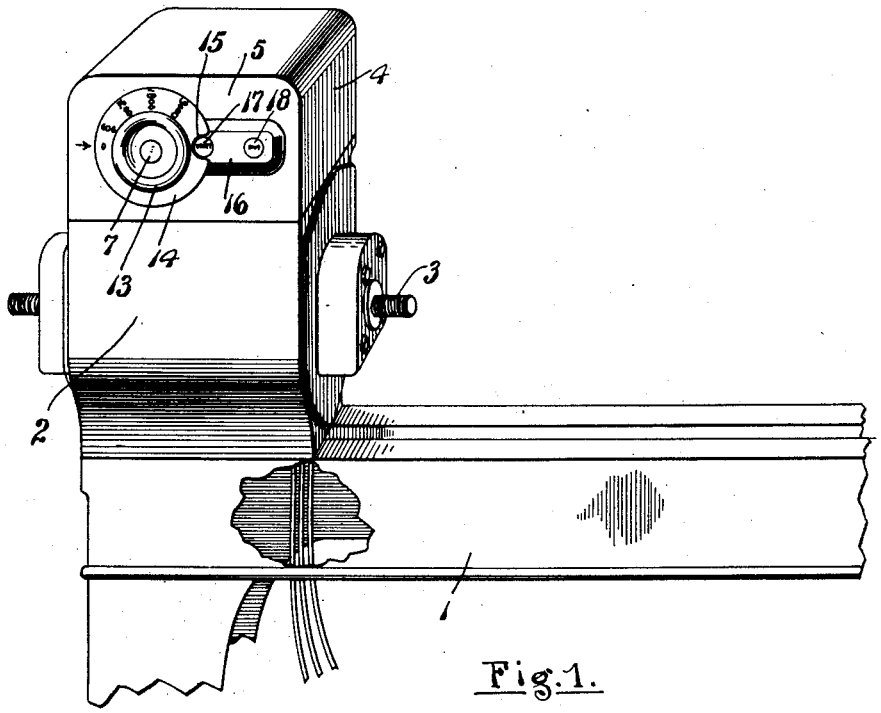
Fig. 1 is a fragmentary perspective of a lathe equipped with the electric motor unit of my invention.
Figure 2:
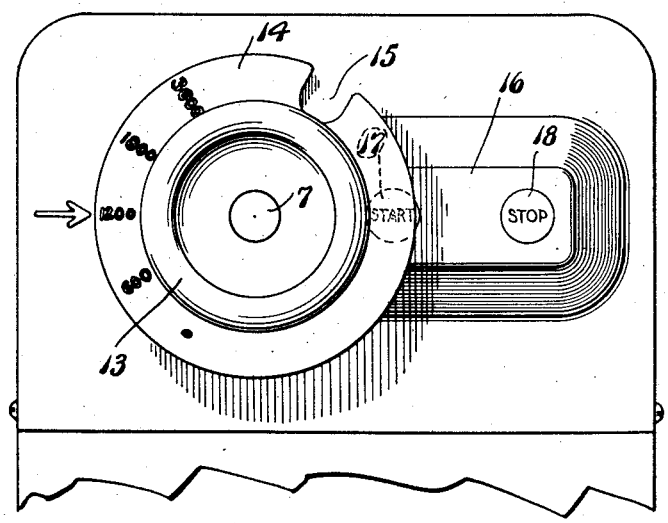
Fig. 2 is a fragmentary enlarged front elevation of the upper portion of said unit.

The electric motor unit of my invention is shown in Fig. 1 as applied at one end of a lathe bed 1. This is one place where the same may be used but it is to be understood that it is not limited in use in any respect to any one type or kind of machine. The motor is mounted in a suitable housing 2 from which its shaft 3 extends so that it may be connected with any mechanism to be driven.

The control and safety devices for the motor are located above the motor housing and are enclosed by a sheet metal cover 4 disposed between two vertical ends 5 and 6 which extend upwardly from the motor housing.

A horizontal shaft 7 is disposed between and rotatably mounted at its ends in said vertical ends 5 and 6. Adjacent the rear end of the shaft a disc 8 is secured having a plurality of notches 9 at one part of its circumference, engaging with which is a roller 10 mounted on an arm 11 pivotally connected to said end 6 and drawn in a downward direction by coiled spring 12. It is apparent that the shaft may be rotated to a number of different positions, the roller 10 engaging successively in the notches 9 so as to hold it in the positions to which it is moved. In practice there are five of said notches though the number of notches which may be used is in no way controlling with respect to this invention. At the front end of the shaft 7 and in front of the member 5 a hand wheel 13 is secured for manually rotating the shaft 7. This wheel is equipped with a disc 14 at its rear side larger in diameter than the wheel and having a notch 15 of the shape shown cut therein at one point. In a raised or embossed housing 16 two buttons 17 and 18 are mounted, the former of which, known as the start button, lies immediately back of the disc 14 and is accessible for operation only when the notch 15 is brought to position so that the start button 17 is uncovered. The stop button 18, on the other hand, is accessible at all times.

Figure 3:
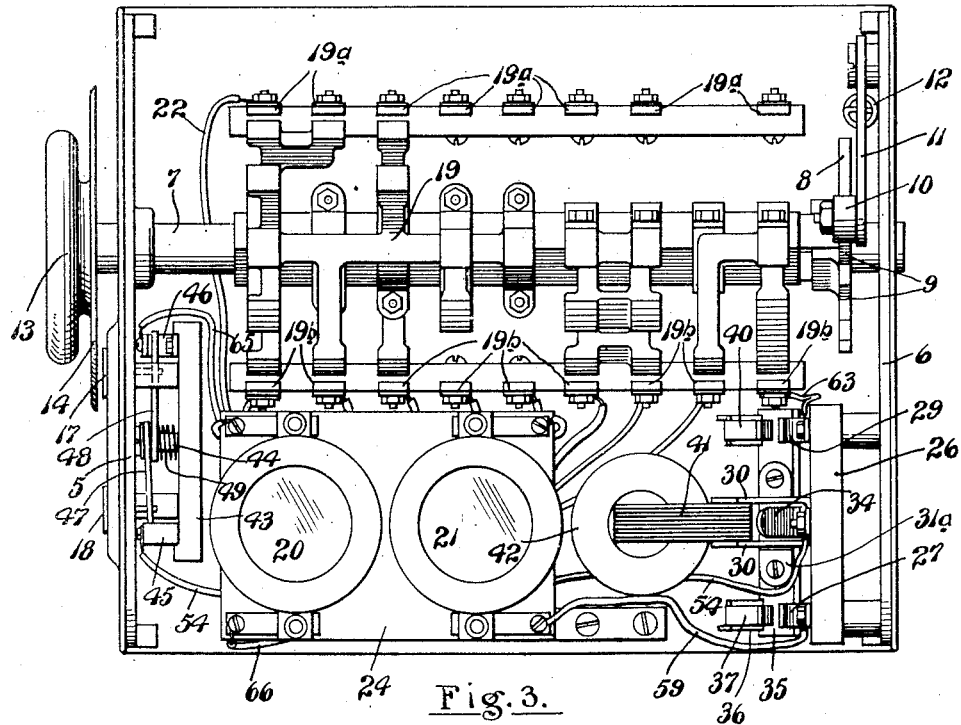
Fig. 3 is an enlarged plan of the unit, the cover for the controls and safety devices for the motor being removed.

The control drum 19 which is mounted on the shaft 7 need not be described in detail as specifically it is old and in itself not the subject matter of the present invention. It is enough to say that it has a plurality of contact surfaces which may be brought into engagement with contact fingers 19$^a$ at one side and 19$^b$ at the other side of the drum, as shown in Fig. 3, different fingers being engaged at the different positions of the drum so as to affect the current passing to the motor to thereby drive it at different speeds. In one position of the drum, this being the position that it occupies when the notch 15 is located so as to be in conjunction with and uncover the buttom 17, no current will pass to the motor and the motor will not be driven. It is in this position only that the start button is accessible for operation, that is, with the motor at rest.

Figure 5:
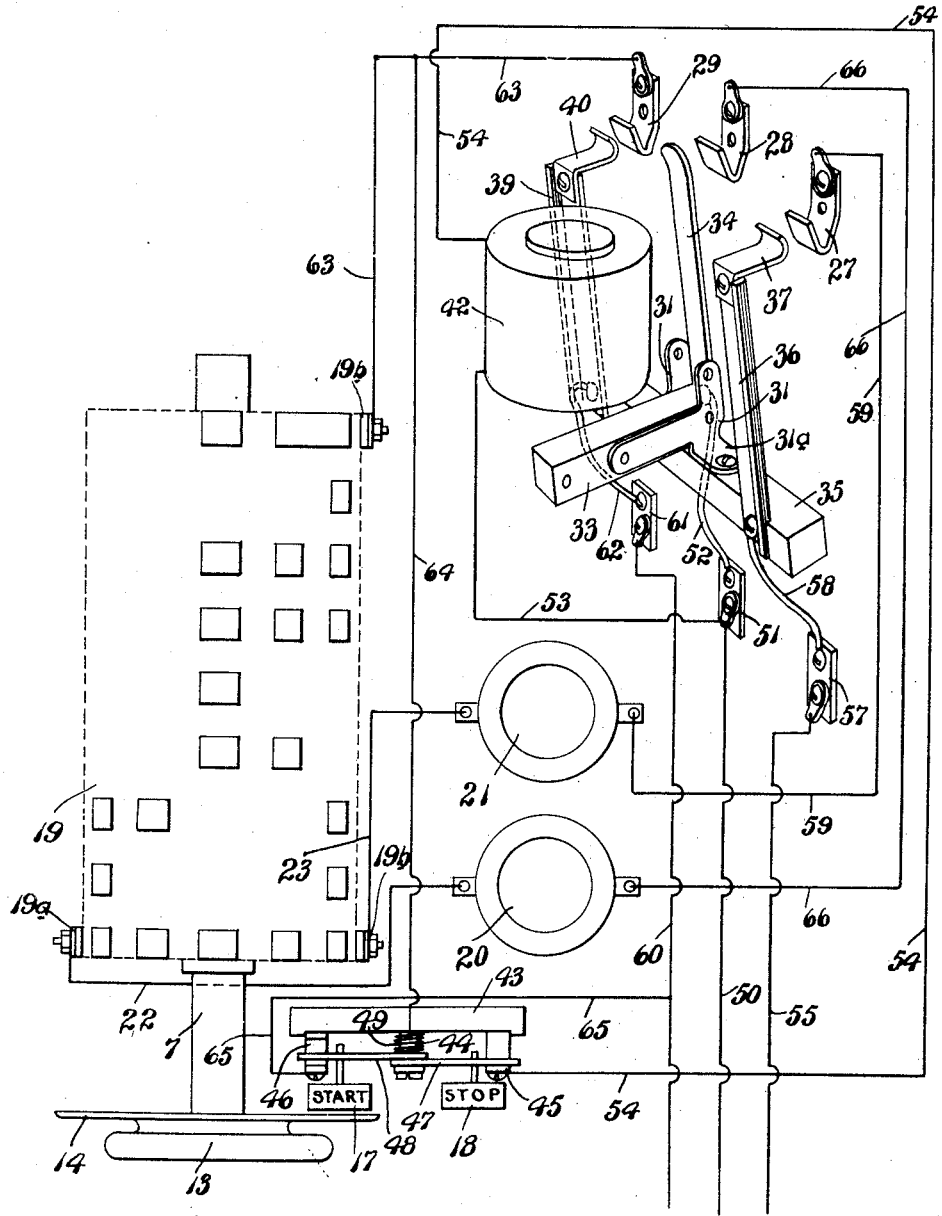
Fig. 5 is a diagram of the wiring used in the electric motor unit so as to connect the control drum, low voltage release and thermal overload fuses in operative relation to each other.

At one side of the front portion of the drum 19 two thermal overload fuses 20 and 21 are located, being connected by wires 22 and 23 respectively with fingers 19$^a$ and 19$^b$ at the front end of the drum as best shown in Fig. 5. These fuses are located on and carried by a block or platform 24 which in turn is supported on a metal bracket 25 secured to the upper side of the motor housing. Fuses of this character in themselves not only permit, for a limited period of time, the passage of excess current, but after a short period of time the same gradually overheat and melt a connecting element therein which breaks the electric circuit in which they are located.

At the opposite end of the control drum and located on the same side of the drum with said fuses, is the low voltage release device. A vertical panel 26 is mounted adjacent to and connected with the end 6 of the housing which covers the motor control and safety devices therefor, on which, near its upper end three contacts 27, 28 and 29 are secured in spaced apart relation, the contact 28 lying between contacts 27 and 29. A supporting bracket having spaced apart sides 30 is connected to the post 26 extending forward therefrom. Two members 31 of substantially bell-crank form are pivotally connected at the upper ends of their vertical arms, as indicated at 32, to said sides 30 of the supporting bracket. A bar 33 of steel or iron or other metal subject to magnetic attraction lies between and is permanently secured to the horizontal arms of said members 31. A contact finger 34 is secured at the front end of the bar 33 and extends upwardly toward the middle contact 28. The members 31 at their lower edges are formed with laterally turned feet 31$^a$ permanently secured to a horizontal bar 35 of electronon-conductive material to which, at one end, a metal bar 36 is permanently secured extending upwardly therefrom and being equipped with a contact finger 37 at its upper end adapted in one position to engage against the contact 27, previously described. Similarly, at its other end, bar 35 carries a vertical bar 39 of metal, similar in all respects to the bar 36, and equipped at its upper end with a finger 40 which may engage against the remaining contact member 29.

It is evident that bar 35 and all of the elements described as connected to and carried by the same, may turn about the axis of the pivot 32 and when turned in one direction, fingers 40, 34 and 37 will come against the contacts 29, 28 and 27, respectively; but when turned in the opposite direction all of said fingers will be out of engagement with their respective contacts. It is also evident that when free to do so the weight of the bar 33 overbalances the construction so that it will tilt in a direction so as to break the engagement of said fingers with their respective contacts. A laminated core 41 of inverted U-shape is secured to and lies partly between the sides 30 of the bracket heretofore described, one leg of the core being located back of the bracket around which a coil 42 is wound, whereby any time that an electric current is passing through said coil, the core 41 is magnetized and exerts an attraction on the bar 33 so as to bring the various fingers 40, 34 and 37 into engagement with their respective contacts.

Back of the start and stop buttons 17 and 18 a bar 43 is located from which a pin 44 extends forwardly between the ends of the bar. At opposite ends of the bar two metal members 45 and 46 are secured also extending forwardly from the bar. Two movable switch bars 47 and 48 are loosely mounted at adjacent ends on the pin 44 and are normally pressed to a forward position by the spring 49 around the pin 44. When in such position the switch bar 47 bears at its free end portion against the member 45 while the other bar 48 lies between the two upwardly extending legs of the member 46.

The wiring diagram for the mechanism is shown in Fig. 5 and includes a ground wire 50 which is connected with a plate 51 from which one wire 52 leads to the finger 34 and another wire 53 leads to the winding 42 of the electromagnet described. The opposite end of the winding 42 is connected with a wire 54 which leads to and is connected to the member 45 previously described. The system of wiring, shown is a three wire system having two feed wires and one ground or return wire. One of the feed wires, shown at 55, connects with a metal plate 57 from which a wire 58 leads to the bar 36. This is the bar which carries finger 37 adapted at times to have contact engagement with the contact 27 from which a wire 59 leads to the thermal overload fuse 21, it being connected at its opposite side by the wire 23 to the finger 19$^b$, as previously described.

The other feed wire 60 joins with a metal plate 61 which is connected with the arm 39 by wire 63. The arm or bar 39 carries the contact finger 40 which at times is brought into engagement with the contact 29 from which a wire 63 leads to the finger 19$^b$, shown in Fig. 5, as previously described. Also from the wire 63 a wire 64 extends to and is connected with the pin 44. From the feed wire 60 a wire 65 leads to and is connected with the U-shape member 46. And from the middle contact 28 a wire 66 leads to the second fuse 20, as shown.

In the operation of the machine, the start button 17 can be operated only when the notch 15 is brought directly over it so that such button is accessible for pressure. At this time the control drum is out of engagement with the various fingers 19$^a$ and 19$^b$. Pressure on the button 17 moves the bar 48 inwardly at its free end until it engages with the rear leg of the U-shaped member 46. This completes an electric circuit from feed wire 60 through wire 65, thence through the bars 48 and 47 and the wire 54 to and through the winding 42 which is connected by the wire 53 with the ground or return 50. The electro-magnet is thus energized and as a result the various fingers 40, 34 and 37 are brought into engagement with their complementary contacts 29, 28 and 27, whereupon, after the switch bar 48 has disengaged from the member 46 a second circuit through the electromagnetic winding 42 maintains the same energized, it being apparent that current flows through wires 60, 62, the bar 39, fingers 40 and 29, wires 63 and 64, pin 44, switch bar 47, wire 54 to the winding 42 and thence returns through wire 53 to the ground 50. Accordingly, it is necessary only to press momentarily on the start button in order to bring the fingers 40, 34 and 37 into engagement with their respective contacts after which the same are held in position until the last described circuit is broken. This is broken by pressing inward on the stop button 18 so that the bar 47 is moved away from the member 45 whereupon the circuit is broken and current flowing through the winding 42 is stopped. The bar 35 carrying said contact fingers 40, 34 and 37 turns through the weight of the parts to break the engagement of said fingers with their respective contact members. Inasmuch as the stop button is accessible at all times it may be operated at any time and in any position of the control drum.

After the start button 17 has been operated the control drum may be moved to various positions so as to drive the motor at different rates of speed. It is evident that the current which is supplied to the motor passes through the fuses 20 and 21. There is a short time when extra current is required at the beginning of operations or when the motor is stepped up from one speed of revolution to the higher speed. These fuses are of the type which will carry an excess current for a short time but when such current is maintained for any considerable length of time they will heat up and destroy the circuit in which they are located. Such fuses therefore serve as an insurance against any excess current passing through the motor for any undesired length of time, yet permit the extra current required at the short periods when the motor is started or is further increased in its speed of revolution.

Figure 4:
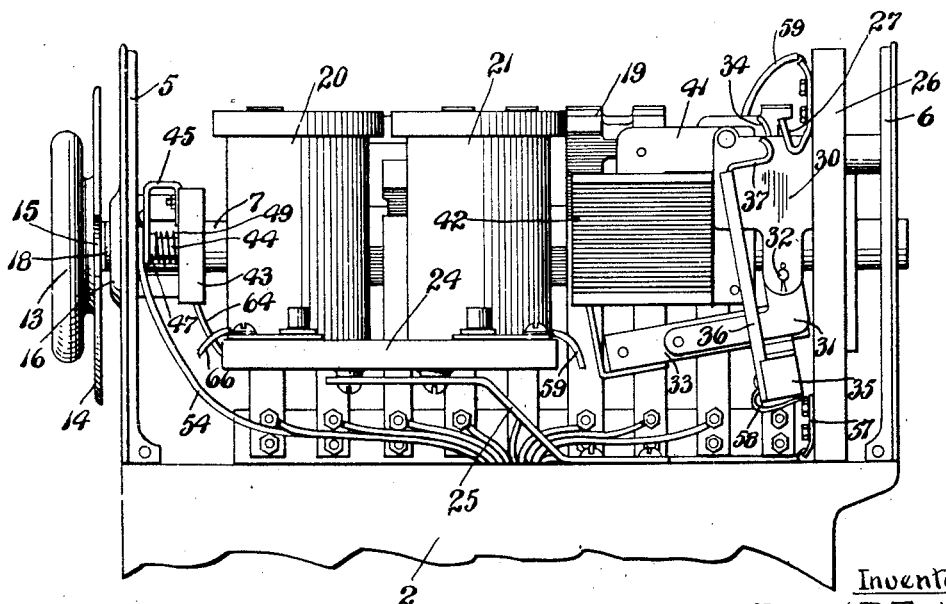
Fig. 4 is a side elevation of the construction shown in Fig. 3.

The design of the winding at 42 is such that should the voltage in the feed line drop below a desired amount the magnet will not be energized sufficiently to hold the fingers 40, 34 and 37 in engagement with their respective contact members, whereupon the connection will be broken and the switch drop to the position shown in Figs. 4 and 5 stopping the motor. This is an insurance against attempting to run the motor on low voltage and is a very desirable feature in connection with electric motor operation.

By this construction it has been possible to build the motor and all of the controls and safety devices therefor in a single unit which is readily transported from one place to another as may be desired and which, when installed on a machine such as a lathe or the like, conceals and covers all the wires except the two feed and the one ground wire so that liability of injury to the insulation of the wires and any short circuit is completely obviated. A very compact and practical unit is thus produced and one which has proved very practical in service. The invention is defined in the appended claims and is to be considered as comprehensive of

I claim:—

1. In combination, with a motor and its housing, of a motor control drum mounted adjacent the housing of the motor, and a low voltage release switch mounted adjacent the drum, and a cover enclosing said drum and switch and attached to the motor housing, said motor and its control drum and the said switch with the housings therefor comprising a unit having all connecting wires between the same enclosed.

2. In a device of the class described, a motor and its housing, spaced apart plates extending upwardly from the motor housing, a control drum for the motor mounted horizontally between said plates, means for manually operating the drums at the outer side of one of said plates, a low voltage release switch for making and breaking current passing to the motor mounted above the motor housing between said vertical plates, and a cover disposed between said plates and over said drum and switch whereby the motor, its control drum and said switch comprise a unit with connecting wiring between the same wholly enclosed.

3. In combination with a motor and its housing, vertical plates extending upwardly from opposite sides of the housing, a control drum for the motor mounted for rotation about a horizontal axis between said plates, a cover for said drum disposed between said plates, and a hand wheel for manually turning the drum located at the outer side of one of said plates, substantially as described.

4. In combination with a motor and its housing, of a second housing disposed at one side of and connected with the motor housing, a control drum, low voltage release switch and thermal overload fuses for controlling the motor and insuring its safety under operation disposed within the second housing immediately adjacent the motor whereby the wiring connection between the motor, control drum, switch and fuses are completely housed and said motor with its control drum, switch and fuses and housings therefor comprise a compact unit.

5. In combination with a motor and its housing, vertical plates extending upwardly from opposite sides of the housing, a shaft on which a control drum for the motor is mounted extending horizontally through said plates, a switch for closing a circuit to conduct electric current to the motor disposed between said plates alongside of said drum, start and stop buttons for closing of the switch when the start button is operated and the release of the switch when the stop button is operated, means for preventing operation of the start button except when the control drum is in position where passage of current to the motor is broken, and a cover for said drum and switch disposed between said plates.

6. In combination, an electric motor, a rotatably mounted control drum therefor, a housing in which said drum is mounted, a shaft carrying the drum having one end extending through a side of the housing, a hand wheel fastened to the projecting end of the shaft, a disc larger in diameter than the hand wheel connected with said hand wheel, said disc having a notch in one side, a normally open switch, a start button located immediately back of the disc and incapable of operation except through said notch, a stop button freely accessible at all times, and electric wiring between said buttons, switch and drum whereby the switch may be closed on operation of the start button and released on operation of the stop button, said control drums when the notch in said disc is in position that the start button may be operated, being at neutral so that no current can pass to the motor, substantially as described.

7. In combination with a motor and its housing, a second housing connected with the motor housing, a control drum rotatably mounted in said second housing, means whereby the control drum may be manually turned to different positions from outside of said second housing, a switch mounted within a second housing, thermal overload fuses mounted within said second housing, means operable from outside of the housing for closing the switch, additional means also operable from outside of the second housing for releasing said switch, and means whereby the switch closing means can be operated only when the drum is at neutral so as to pass no current to the motor, substantially as described.

In testimony whereof I affix my signature.

HOWARD B. TUTHILL.